United States Patent
Ng

(10) Patent No.: US 6,202,203 B1
(45) Date of Patent: *Mar. 13, 2001

(54) METHOD OF, SYSTEM FOR, AND COMPUTER PROGRAM PRODUCT FOR PROVIDING GLOBAL VALUE NUMBERING

(75) Inventor: John Shek-Luen Ng, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/568,075

(22) Filed: Dec. 6, 1995

(51) Int. Cl.[7] .................................................... G06F 9/45

(52) U.S. Cl. ................................................................ 717/9

(58) Field of Search .................................. 395/709, 708; 717/9, 8

(56) References Cited

U.S. PATENT DOCUMENTS

| | | | |
|---|---|---|---|
| 4,398,249 | * 8/1983 | Pardo et al. | 364/300 |
| 4,642,764 | * 2/1987 | Auslander et al. | 364/300 |
| 4,656,583 | * 4/1987 | Auslander et al. | 364/300 |
| 4,802,091 | * 1/1989 | Cocke et al. | 364/300 |
| 5,327,561 | * 7/1994 | Choi et al. | 395/700 |
| 5,448,737 | * 9/1995 | Burke et al. | 395/700 |
| 5,659,754 | 8/1997 | Grove et al. | 395/709 |
| 5,768,596 | * 6/1998 | Chow et al. | 395/709 |
| 5,790,867 | * 8/1998 | Schmidt et al. | 395/709 |

OTHER PUBLICATIONS

A. V. Aho, R. Sethi, J. D. Ullman, Compilers Principles, Techniques, and Tools, Addison Wesley, pp. 292–293, 528–533, 634–636, 709, 1986.*

J. Choi, R. Cytron, J. Ferrnate, "On the Efficient Engineering of Ambitious Program Analysis", IEEE Trans. Software Eng. vol. 20, No. 2, pp 105–114, 1994.*

B. K. Rosen, M. N. Wegmen, and F. K. Zadeck, "Global value numbers and redundant computations", 15th ACM Principles of Programming Languages Symposium, San Diego, CA, pp. 12–27, 1988.*

H. Y.Saade, et al, "Value Numbering in the Context of Merging Control Flow", IBM Technical Disclosure Bulletin, vol. 25, No. 12, pp. 6338–6341, May 1983.*

C. Click, "Global Code Motion Global Value Numbering", ACM, pp. 246–257, Jun. 1995.*

K. Pingali, et al, "Dependence Flow Graphs: An Agebraic Approach to Program Dependencies", ACM, pp. 67–78, 1990.*

Rosen et al, Global Value Numbers and Redundant Computations, ACM, pp. 12–27, Dec. 1988.*

(List continued on next page.)

Primary Examiner—Majid Banankhah
Assistant Examiner—Sue Lao
(74) Attorney, Agent, or Firm—Prentiss Wayne Johnson

(57) ABSTRACT

A fast and efficient way of performing global value numbering beyond basic blocks and extended basic blocks on a complete topological ordering of basic blocks in a program. Global value numbering makes use of an unknown value number and iterative processing of a worklist containing expressions assigned an unknown value number. A hash table is used to reduce storage and processing time.

12 Claims, 5 Drawing Sheets

OTHER PUBLICATIONS

E. Morel and C. Renvoise, "Global Optimization by Suppression of Partial Redundancies", Communications of the ACM, vol. 22, No. 2, Feb. 1979, p. 96–103.

B. Rosen, M. Wegman, and K. Zadeck, "Global Value Numbers and Redundant Computations", Fifteenth ACM Principles of Programming Languages Symposium, 12–27, Jan. 1988, San Diego, CA.

R. Cytron and J. Ferrante, "An Efficient Method for Computing Static Single Assignment Form", Sixteenth Annual ACM Symposium on Principles of Programming Languages Symposium, 25–35, Jan. 1989. Also published as "Efficiently Computing Static Single Assignment Form and the Control Dependence Graph", RC 14756, Jul. 10, 1989, IBM Research Report.

B. Alpern, N. Wegman, and F. Zadeck, "Detecting Equality of Values in Programs", Conf. Rec. Fifteenth ACM Symposium on Principles of Programming Languages Symposium, 1–11, Jan. 1988.

Takimoto et al, "Partial Redundancy Elimination Based on Phi Function Motion", Japan Science, p. 21–30.

* cited by examiner

METHOD OF, SYSTEM FOR, AND COMPUTER PROGRAM PRODUCT FOR PROVIDING GLOBAL VALUE NUMBERING

CROSS-REFERENCE TO RELATED APPLICATIONS

Application Ser. No. 08/568,079, filed concurrently herewith on Dec. 6, 1995 for A Method of, System for, and Computer Program Product for Providing Improved Code Motion and Code Redundancy Removal Using Extended Global Value Numbering (IBM Docket ST9-95-007), currently co-pending, and assigned to the same assignee as the present invention; and Application Ser. No. 08/568,216 filed concurrently herewith on Dec. 6, 1995 for A Method of, System for, and Computer Program Product for Providing Extended Global Value Numbering (IBM Docket ST9-95-061), currently co-pending, and assigned to the same assignee as the present invention.

The foregoing copending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to optimizing compilers for development of computer programs for use on a computer, and more particularly to value numbering.

2. Description of the Related Art

A problem addressed by the optimizing compiler prior art is equivalence of expressions. Value numbering is a conventional technique for identifying expressions of equivalent values. A value number in the prior art is a symbolic execution of a basic block of code, in which all variables entering that basic block of code (straight line code) are given distinct symbolic values or value numbers. The technique of value numbering is used for common subexpression elimination within a basic block, where if a symbolic value is computed twice within the same basic block, then it may be eliminated the second time. However, use of the prior art value number techniques are limited to a single basic block or an extended basic block (two adjacent basic blocks). The prior art techniques do not provide optimizations such as common subexpression elimination or redundancy removal beyond basic blocks and extended basic blocks to an entire program consisting of multiple extended basic blocks.

Value numbering optimization may be understood by reference to the optimizing compiler art. FIG. 1 illustrates a procedure for translating a program 10 to create an executable binary object program 12. A lexical/syntax analysis 14 is conducted to transform source program 10 to a first intermediate language program 16. First intermediate language program 16 is then processed by an optimization routine 18 to create a second intermediate language program 20, which is then directly interpreted by the code generation routine 22 to create object program 12.

Optimization routine 18 is illustrated in FIG. 2 as it is understood in the art. Optimization processing is achieved by first performing a control flow analysis in routine 24 of first intermediate language 16. Control flow analysis routine 24 provides the control flow data 26, which are then passed to a data-flow analysis routine 28 wherein first intermediate language program 16 is analyzed for data flow. Conventional value numbering may be regarded as part of this data flow analysis. Data-flow analysis routine 28 produces the data-flow data 30. Finally, a program transformation procedure 32 accepts control flow data 26, data-flow data 30, and first intermediate language program 16 to produce second intermediate language program 20. Optimization routine 18 may use value numbering to enable the program transformation procedure 32 to perform various optimizations such as induction variable analysis, dependence analysis, and loop fusion.

Many methods for value numbering are known in the art. For instance, in Rosen et al. (B. Rosen, M. Wegman, and K. Zadeck, "Global Value Numbers and Redundant Computations", Fifteenth ACM Principles of Programming Languages Symposium, 12–27, January 1988, San Diego, Calif.), a program is translated into Static Single Assignment Form (SSA). See Cytron et al. (R. Cytron and J. Ferrante, "An Efficient Method for Computing Static Single Assignment Form", Sixteenth Annual ACM Symposium on Principles of Programming Languages Symposium, 25–35, January 1989), and then value numbering is performed locally in basic blocks.

Thus, practitioners in the art generally employ value numbers only within basic blocks or extended basic blocks to perform various optimizations, and there is an accordingly clearly-felt need in the art for a global value numbering that may be performed globally across an entire computer program.

SUMMARY OF THE INVENTION

The invention disclosed herein comprises a method of, system for, and computer program product for providing a fast and efficient way of performing global value numbering beyond basic blocks and extended basic blocks on a complete topological ordering of basic blocks in a program. Global value numbering makes use of an unknown value number and iterative processing of a worklist containing expressions assigned an unknown value number. A hash table is used to reduce storage and processing time.

In one aspect of the present invention, value numbering is performed globally within an entire program.

In another aspect of the present invention, a fast and efficient technique for performing global value numbering based on Static Single Assignment Form (SSA) is provided.

The present invention has the advantage of providing improved compilation optimization.

The present invention has the further advantage of improved optimization with reduced compilation time.

The present invention has the further advantage of improved optimization with reduced storage.

BRIEF DESCRIPTION OF THE DRAWINGS

For a more complete understanding of the present invention and the advantages thereof, reference is now made to the Detailed Description in conjunction with the attached Drawings, in which.

DESCRIPTION OF THE PREFERRED EMBODIMENT

The Global Value Numbering of the present invention is performed by walking the basic blocks of the program in topological order and assigning value numbers to expressions. With the back edges ignored in the flow-graph, the postorder (left-right-root) traversal gives reverse topological order.

The Extended Global Value Numbering of the present invention may be performed by the following steps:
Walks basic blocks in topological order of the flow graph.
For all expressions and φ-functions in a basic block, perform value numbering as follows:
    if an expression has opcode, operand-1, operand-2, . . . operand-n, then the Hash keys are matched as "opcode, valuenum-1, valuenum-2, . . . valuenum-n" where valuenum-i is the corresponding value numbers of the i-th operand. Value number 0 and value number 1 are reserved. "0" is regarded as unassigned and "1" is regarded as unknown. "1" is used for expressions of volatile variables and pointers with unknown aliasing information.
    From SSA access functions, fetch the Value Number of each operand from its definition. If the operand does not have a definition (e.g. uninitalized variables or external variables), force it to have a new value number and propagate its value number to other uses through the SSA access functions. If the definition of the operand is not yet value numbered, put that operand on a worklist and continue with the processing.
Rules for assign value numbers at φ-functions.

for xm=φ(x0, x1, . . . , xn)

a. if the value numbers of all operands are the same, then the result will receive the same value number
   b. else if the value number of any operand is equal to 1 (unknown), then the result is 1 (unknown).
   c. else assign a new value to the result.
At the end of the first pass, if the worklist is non-empty then repeat the above processing for expressions in the worklist During the second pass, if an operand still does not have a value number, it will be forced to receive a new one. This is possible when φ-functions are defined in a recursive manner.

Figure 1:
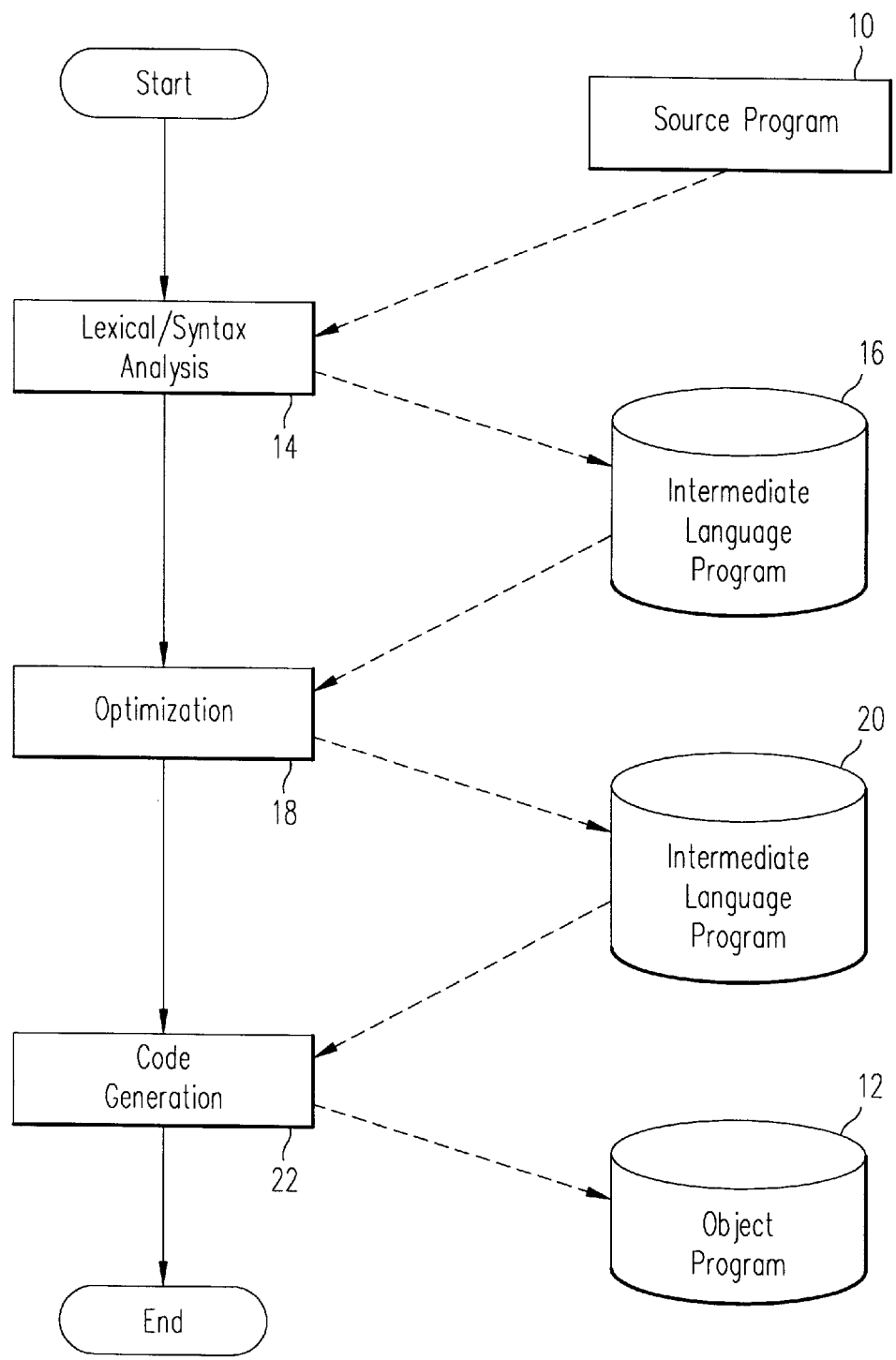
FIG. 1 shows a functional block diagram of an exemplary compiling method from the prior art.
Figure 2:
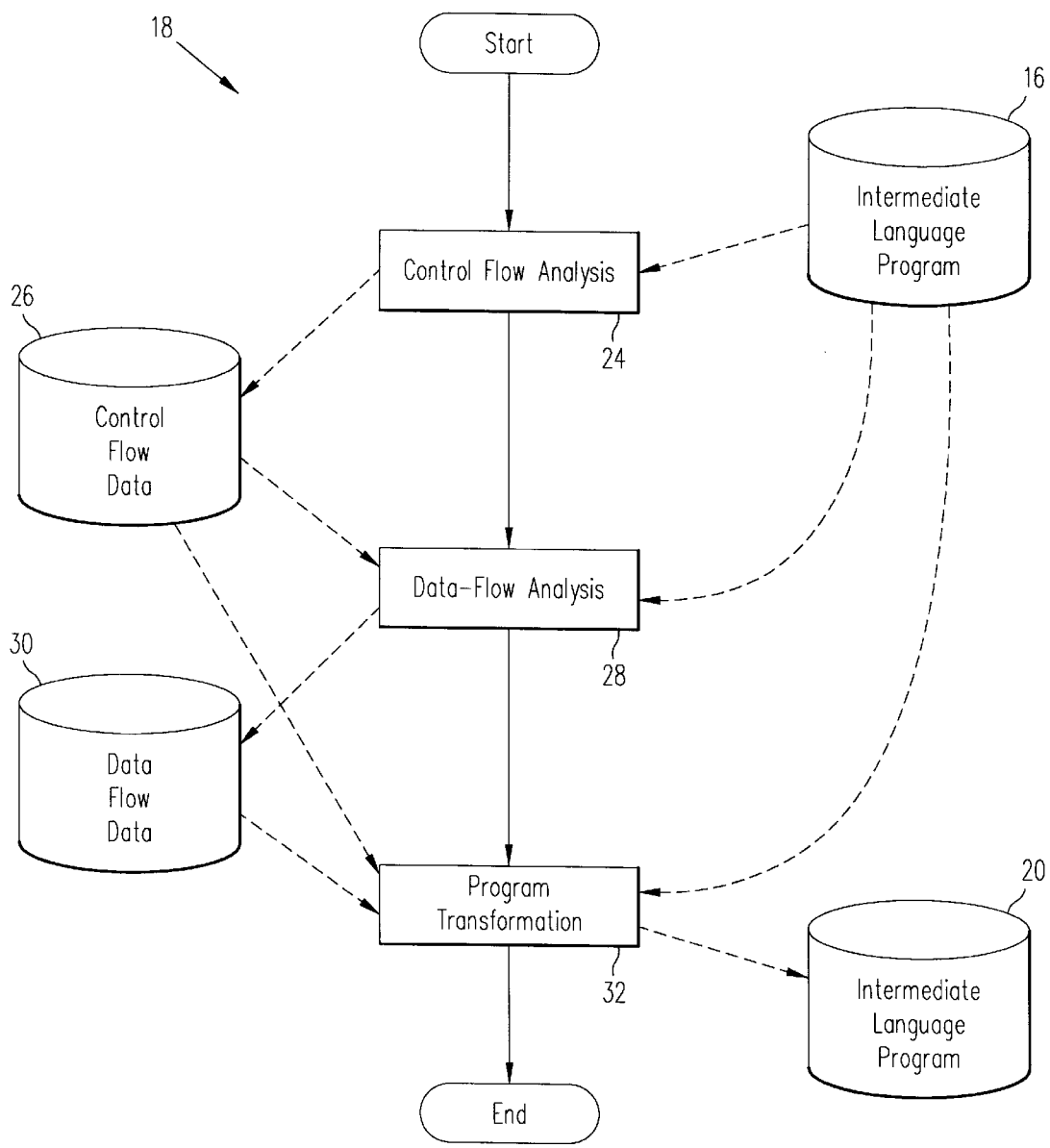
FIG. 2 shows a functional block diagram of an exemplary compiling optimization method from the prior art.
Figure 3:
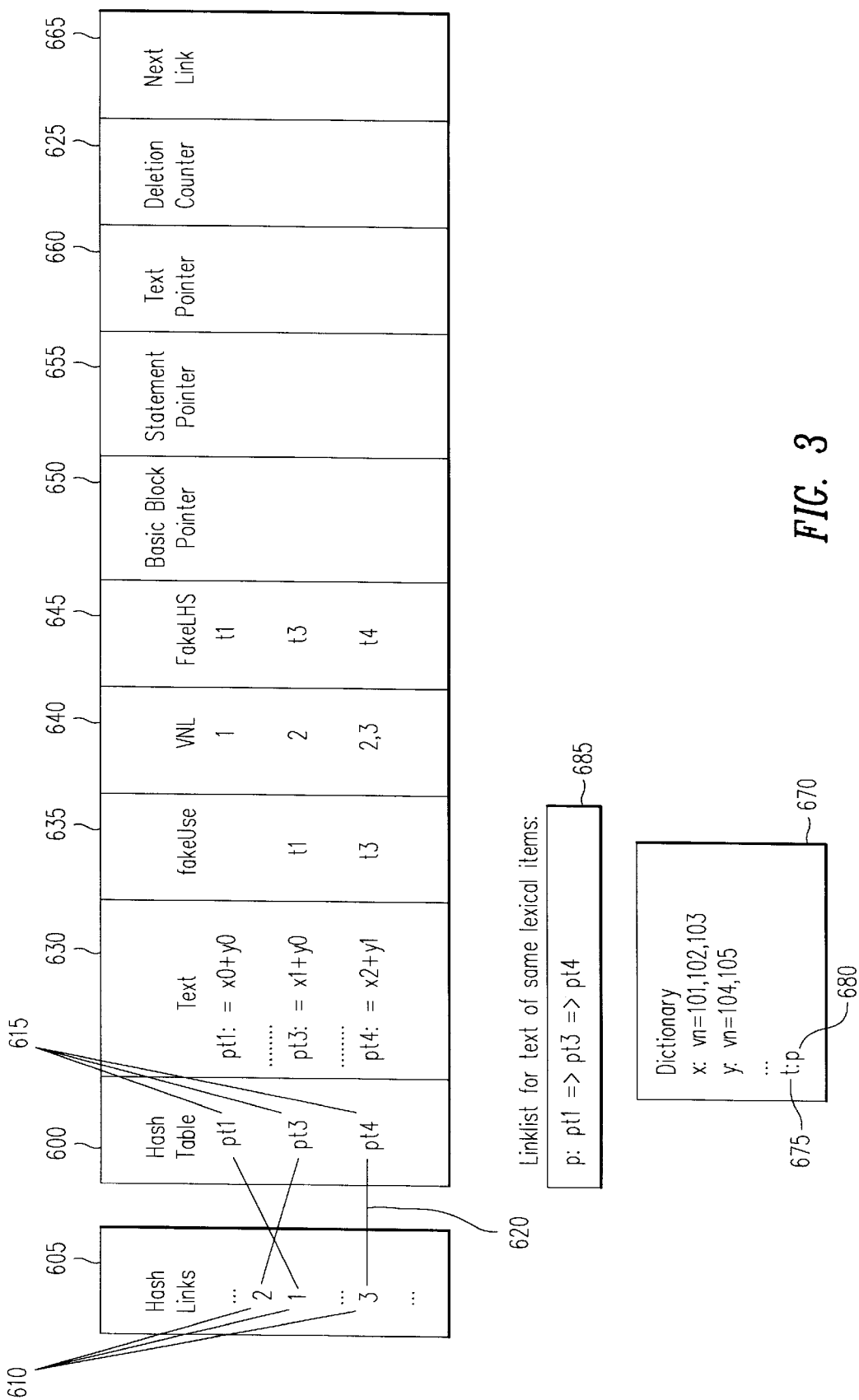
FIG. 3 is a functional block diagram of a Hash Table and associated tables in accordance with the present invention.

A Hash Table 600, illustrated in FIG. 3, is used for fast access in Global Value Numbering. This Hash Table 600 reduces the search time and space needed. This Hash Table 600 also enables the searches to be done with "context" and in a predictive manner, as opposed to conventional methods.

The Hash Table 600 is used to save and retrieve the value number of an expression. Value numbering is performed in topological order of the program flow graph. SSA access functions are used to get definitions from uses and from uses to uses. The topological order traversal will ensure that most "definitions" will be visited before "uses". This is not always possible in the presence of loops. Uses that do not have a definition will be forced to receive a new value number. Uses encountered before definitions during the processing will be put in a worklist and will be processed in another pass. Value numbering is completed when the worklist becomes empty.

Figure 4:
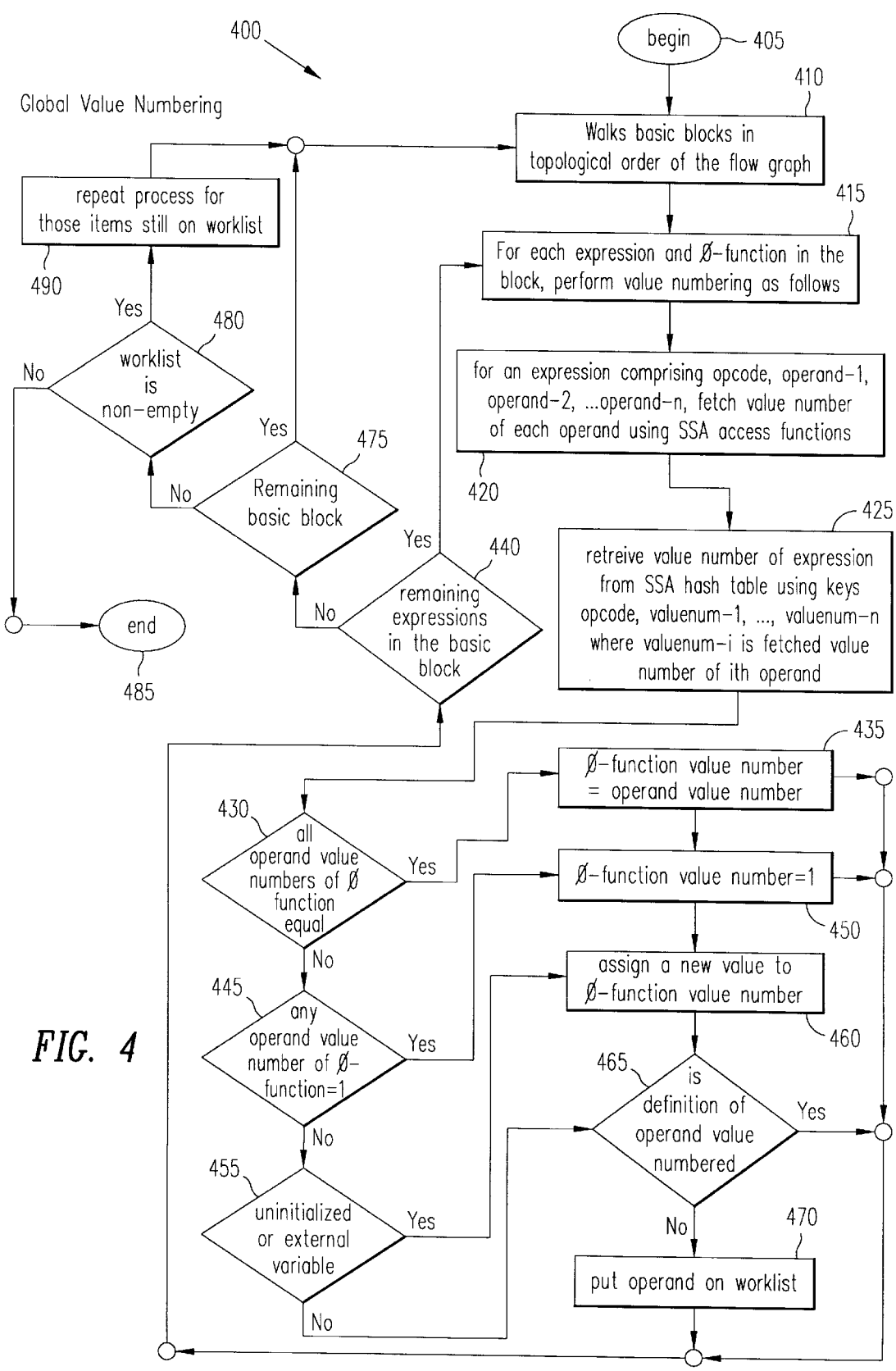
FIG. 4 is a flowchart illustrating the operations preferred in carrying out the present invention.

An example of a Hash Table 600 and its associated tables are shown in FIG. 4. HashLinks 605 is the table in which the keys are initially hashed. Each entry 610 contains an index to the Hash Table 600. Hash Table records 615 are assigned sequentially. HashLinks indexes 620 are used wherever the keys are hashed. In general, the HashLinks index 620 to the Hash Table 600 equals to mod(valuenum, hash_table_size). Since Hash Table records 615 can be reused after garbage collection, in order to assure unique value numbers, the same value number cannot be used again the next time that record is reused. To assure this, the value number is incremented by deletion_counter * hash_table_size. The deletion_counter 625 shows how many times a Hash Table record is reused after garbage collection. A stack is used to hold entries of Hash Table records that are freed after garbage collection.

The original names before the SSA renaming is also hashed. An entry, say x+y, points to a link list that has the text pointers for x0+y0, x1+y0, etc. Some expressions may evaluate to a text that does not exist, in which case, the hash key, constructed primarily of the opcode and the operands, is stored instead of the text pointer.

Each Hash Table record may contain the following fields:
Text 630 containing the text of an expression;
FakeUse 635 indicating which definition reaches the expression;
VNL 640 holding the Value Number List of an expression;
FakeLHS 645 which is a work field for the construction and renaming of a temporary expression. Interblock temporaries are created at the end when redundancies are found.
Basic block pointer 650;
Statement pointer 655;
Text pointer or constructed Hash Key 660;
Deletion counter 625; and
NextLink 665 which points to the next record for items that have collisions.

A Hash Table dictionary 670 holds an array of value numbers corresponding to each name used. Temporarys 675 are created to hold expressions for redundancy checking. The pointer (p) 680 to the linklist 685 is copied from the Hash Table 600 to the dictionary 670 when the temporary 675 is created.

Referring now to FIG. 4, a flowchart illustrating operations preferred in carrying out the present invention Global Value Numbering 400 is shown. In the flowchart, the graphical conventions of a diamond for a test or decision and a rectangle for a process or function are used. These conventions are well understood by those skilled in the art, and the flowcharts are sufficient to enable one of ordinary skill to write code in any suitable computer programming language.

The process begins at process block 405. Thereafter, process block 410 begins a loop that walks the basic blocks in topological order of the flow graph. Thereafter, process block 415 begins a loop for each expression and φ-function in the basic block to perform value numbering. Thereafter, process block 420 fetches a value number of each operand using SSA access functions for the expression comprising opcode, operand-1, operand-2, . . . operand-n. Thereafter, process block 425 retreives a value number of the expression from an SSA Hash Table using keys opcode, valuenum-1, . . . , valuenum-n where valuenum-1 is the fetched value number of the ith operand of the expression. Thereafter, decision block 430 determines if all of the operand value numbers of the φ-function are equal. If all of the operand value numbers of the φ-function are equal, then process block 435 sets the φ-function value number equal to the operand value number. Thereafter, decision block 440 determines if there are remaining expressions in the basic block to be processed by the loop. If there are remaining expressions in the basic block to be processed, then processing loops back to process block 415 to perform value numbering for the next expression in the basic block.

Returning now to decision block 430, if all of the operand value numbers of the φ-function are not equal, then decision block 445 determines if any of the operand value numbers of the φ-function are equal to 1. If any of the operand value numbers of the φ-function are equal to 1, then process block 450 sets the φ-function value number equal to 1. Thereafter, processing continues to decision block 440 to determine if there are remaining expressions in the basic block to be processed by the loop.

Returning now to decision block 445, if none of the operand value numbers of the φ-function are equal to 1, then decision block 455 determines if there is an uninitialized or external variable. If there is an uninitialized or external variable, then process block 460 assigns a new value to the φ-function value number. Thereafter, decision block 465 determines if the definition of the operand is value numbered. If the definition of the operand is value numbered, then processing continues to decision block 440 to determine if there are remaining expressions in the basic block to be processed by the loop.

Returning now to decision block 455, if there is not an uninitialized or external variable, then processing continues to decision block 465 to determine if the definition of the operand is value numbered.

Returning now to decision block 465, if the definition of the operand is not value numbered, then process block 470 puts the operand on the worklist. Thereafter, processing continues to decision block 440 to determine if there are remaining expressions in the basic block to be processed by the loop.

Returning now to decision block 440, if there are no remaining expressions in the basic block to be processed by the loop, then decision block 475 determines if there is a remaining basic block to be processed by the loop. If there is a remaining basic block to be processed, then processing loops back to process block 410 to process the next basic block in topological order of the flow graph.

Returning now to decision block 475, if there is no remaining basic block to be processed, then decision block 480 determines if the worklist is empty. If the worklist is not empty, then process block 490 reinitializes the loop starting at process block 410 to repeat the processing for those items still on the worklist. Thereafter, processing continues back to process block 410 to begin again a loop that walks the basic blocks in topological order of the flow graph for the items still on the worklist.

Returning now to decision block 480, if the worklist is empty, then the process ends at process block 485.

Figure 5:
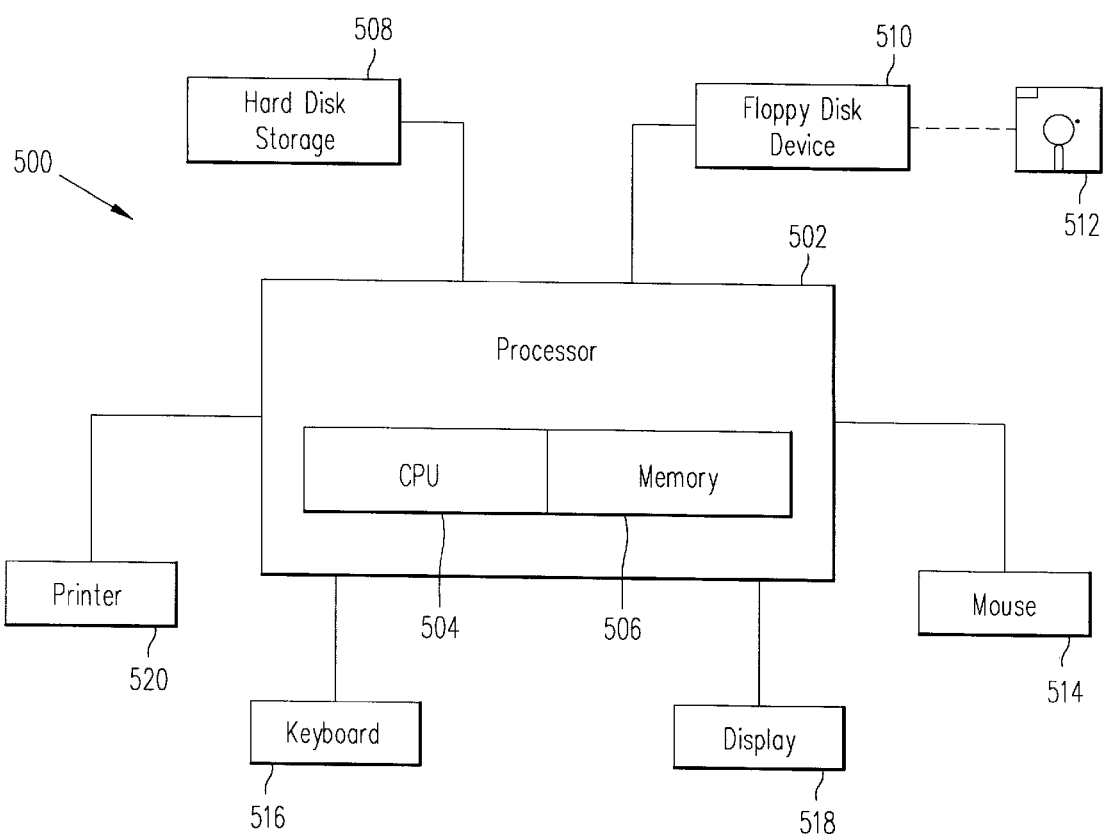
FIG. 5 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 5, a block diagram illustrates a computer system 500 used in performing the method of the present invention, forming part of the apparatus of the present invention, and which may use the article of manufacture comprising a computer-readable storage medium having a computer program embodied in said medium which may cause the computer system to practice the present invention. The computer system 500 includes a processor 502, which includes a central processing unit (CPU) 504, and a memory 506. Additional memory, in the form of a hard disk file storage 508 and a computer-readable storage device 510, is connected to the processor 502. Computer-readable storage device 510 receives a computer-readable storage medium 512 having a computer program embodied in said medium which may cause the computer system to implement the present invention in the computer system 500. The computer system 500 includes user interface hardware, including a mouse 514 and a keyboard 516 for allowing user input to the processor 502 and a display 518 for presenting visual data to the user. The computer system may also include a printer 520.

Although the present invention has been particularly shown and described with reference to a preferred embodiment, it will be understood by those skilled in the art that various changes in form and detail may be made without departing from the spirit and the scope of the invention.

I claim:

1. A method of performing value numbering for optimization of a computer program, said value numbering being performed by a value number processing which assigns value numbers, said method comprising the steps of:

determining a complete topological order of a plurality of basic blocks from a flow graph of the computer program;

processing the plurality of basic blocks in the complete topological order, wherein the processing comprises assigning a value number to each expression in each of the plurality of basic blocks, wherein the value number is a symbolic execution of a basic block of the computer program, in which each variable entering the basic block is given a distinct symbolic value comprising the value number;

assigning a value of a definite value number to each value number corresponding to each expression of a first subset of the expressions;

assigning a value of unknown to at least one value number corresponding to each expression of a second subset of the expressions, the assignment of the value of unknown indicating that although the at least one value number has been processed by the value number processing, the assignment of a definite known value number is to be postponed until later in the value number processing, the second subset comprising phi-functions having an operand whose value number is assigned a value of unknown, and op-codes having an operand whose value number is assigned a value of unknown and assigning a value representing unassigned to each value number corresponding to each expression of a third subset of the expressions, said unassigned value indicating that the corresponding expression has not yet been processed by the value number processing and that neither a definite value nor an unknown value is yet assigned to the value number of the third subset by the value number processing.

2. The method of claim 1 wherein the processing step further comprises the steps of:

placing each of the second subset on a worklist;

removing from the worklist an expression of the second subset if the expression does not have at least one corresponding value number assigned a value of unknown after assigning a value number to the expression of the second subset; and repeating the processing for the second subset until the worklist is empty.

3. The method of claim 2:

wherein the assigning for the second subset further comprises the step of:

assigning a value of unknown to a value number corresponding to a definition of an operand of an expression if a value number is not assigned to the definition, assigning a value of unknown to a value number corresponding to a result of the expression if the value number corresponding to any operand of the expression is assigned a value of unknown, and if any value number corresponding to any operand of a φ-function is assigned a value of unknown, then assigning a value of unknown to the value number corresponding to the φ-function.

4. The method of claim 3 further comprising the steps of:

for each operand of each expression:
  if the operand does not have a definition, assigning the operand a new unique value number and propagating this new unique value number to other uses of this operand, and
  if the operand has a definition, but a value number is not assigned to the definition, then assigning a value of unknown to a value number corresponding to the definition;

for each result of each expression:
  if value numbers assigned to each operand of the expression are a same value number, then assigning the same value number to the result of the expression, else if the value number of any operand of the expression is assigned a value of unknown, then assigning a value of unknown to a value number corresponding to the result of the expression,
  else assigning a new unique value number to the result of the expression; and for each φ-function:
  if all value numbers of all operands of a φ-function are equal, then assigning a value number of the φ-function to the equal value numbers,
  if all value numbers of all operands of a φ-function are not equal, then assigning a new unique value number to the value number of the φ-function, and
  if any value number of any operand of a φ-function is assigned a value of unknown, then assigning a value of unknown to a value number corresponding to the φ-function.

5. A computer system for performing value numbering for optimization of a computer program, said value numbering being performed by a value number processing which assigns value numbers said computer system comprising:

means for determining a complete topological order of a plurality of basic blocks from a flow graph of the computer program;

means for processing the plurality of basic blocks in the complete topological order, wherein the processing comprises assigning a value number to each expression in each of the plurality of basic blocks, wherein the value number is a symbolic execution of a basic block of the computer program, in which each variable entering the basic block is given a distinct symbolic value comprising the value number;

means for assigning a value of a definite value number to each value number corresponding to each expression of a first subset of the expressions;

means for assigning a value of unknown to at least one value number corresponding to each expression of a second subset of the expressions, the assignment of the value of unknown indicating that although the at least one value number has been processed by the value number processing, the assignment of a definite known value number is to be postponed until later in the value number processing, the second subset comprising phi-functions having an operand whose value number is assigned a value of unknown, and op-codes having an operand whose value number is assigned a value of unknown; and means for assigning a value representing unassigned to each value number corresponding to each expression of a third subset of the expressions, said unassigned value indicating that the corresponding expression has not yet been processed by the value number processing and that neither a definite value nor an unknown value is yet assigned to the value number of the third subset by the value number processing.

6. The computer system of claim 5 wherein the processing means further comprises:

means for placing each of the second subset on a worklist;

means for removing from the worklist an expression of the second subset if the expression does not have at least one corresponding value number assigned a value of unknown after assigning a value number to the expression of the second subset; and means for repeating the processing for the second subset until the worklist is empty.

7. The computer system of claim 6:

wherein the assigning means for the second subset further comprises:

means for assigning a value of unknown to a value number corresponding to a definition of an operand of an expression if a value number is not assigned to the definition, means for assigning a value of unknown to a value number corresponding to a result of the expression if the value number corresponding to any operand of the expression is assigned a value of unknown, and means for assigning a value of unknown to the value number corresponding to the φ-function if any value number corresponding to any operand of a φ-function is assigned a value of unknown.

8. The computer system of claim 7 further comprising:

for each operand of each expression:
  means for assigning the operand a new unique value number if the operand does not have a definition, and for propagating this new unique value number to other uses of this operand, and means for assigning a value of unknown to a value number corresponding to the definition if the operand has a definition, but a value number is not assigned to the definition;

for each result of each expression:
  means for assigning the same value number to the result of the expression if value numbers assigned to each operand of the expression are a same value number, else assigning a value of unknown to a value number corresponding to the result of the expression if a value number of any operand of the expression is assigned a value of unknown,
  else assigning a new unique value number to the result of the expression; and for each φ-function:
  means for assigning a value number of the φ-function to an equal value number if all value numbers of all operands of a φ-function are equal,
  means for assigning a new unique value number to the value number of the φ-function if all value numbers of all operands of the φ-function are not equal, and means for assigning a value of unknown to a value number corresponding to the value number of the φ-function if any value number of any operand of the φ-function is assigned a value of unknown.

9. An article of manufacture for use in a computer system performing value numbering for optimization of a computer program, said value numbering being performed by a value number processing which assigns value numbers, said article of manufacture comprising a computer-readable storage medium having a computer program embodied in said medium which may cause the computer system to:

determine a complete topological order of a plurality of basic blocks from a flow graph of the computer program;

process the plurality of basic blocks in the complete topological order, wherein the processing comprises assigning a value number to each expression in each of the plurality of basic blocks, wherein the value number is a symbolic execution of a basic block of the computer program, in which each variable entering the basic block is given a distinct symbolic value comprising the value number;

assign a value of a definite value number to each value number corresponding to each expression of a first subset of the expressions;

assign a value of unknown to at least one value number corresponding to each expression of a second subset of the expressions, the assignment of the value of unknown indicating that although the at least one value number has been processed by the value number processing, the assignment of a definite known value number is to be postponed until later in the value number processing, the second subset comprising phi-functions having an operand whose value number is assigned a value of unknown, and op-codes having an operand whose value number is assigned a value of unknown; and assign a value representing unassigned to each value number corresponding to each expression of a third subset of the expressions, said unassigned value indicating that the corresponding expression has not yet been processed by the value number processing and that neither a definite value nor an unknown value is yet assigned to the value number of the third subset by the value number processing.

10. The article of manufacture of claim 9 wherein the processing may further cause the computer system to:

place each of the second subset on a worklist;

remove from the worklist an expression of the second subset if the expression does not have at least one corresponding value number assigned a value of unknown after assigning a value number to the expression of the second subset; and repeat the processing for the second subset until the worklist is empty.

11. The article of manufacture of claim 10:

wherein the assigning for the second subset may further cause the computer system to:

assigning a value of unknown to a value number corresponding to a definition of an operand of an expression if a value number is not assigned to the definition, assigning a value of unknown to a value number corresponding to a result of the expression if the value number corresponding to any operand of the expression is assigned a value of unknown, and if any value number corresponding to any operand of a φ-function is assigned a value of unknown, then assigning a value of unknown to the value number corresponding to the φ-function.

12. The article of manufacture of claim 11 wherein the processing may further cause the computer system to:

for each operand of each expression:
  if the operand does not have a definition, assign the operand a new unique value number and propagate this new unique value number to other uses of this operand, and
  if the operand has a definition, but a value number is not assigned to the definition, then assign a value of unknown to a value number corresponding to the definition;

for each result of each expression:
  if value numbers assigned to each operand of the expression are a same value number, then assign the same value number to the result of the expression,
  else if the value number of any operand of the expression is assigned a value of unknown, then assign a value of unknown to a value number corresponding to the result of the expression,
  else assign a new unique value number to the result of the expression; and for each φ-function:
  if all value numbers of all operands of a φ-function are equal, then assign a value number of the φ-function to the equal value numbers,
  if all value numbers of all operands of a φ-function are not equal, then assign a new unique value number to the value number of the φ-function, and
  if any value number of any operand of a φ-function is assigned a value of unknown, then assign a value of unknown to a value number corresponding to the φ-function.

* * * * *